Aug. 5, 1969   P. M. MARASCO ET AL   3,459,478
STADIAMETRIC RANGEFINDER INCLUDING A
TRANSVERSELY MOVABLE LENS
Filed Dec. 2, 1968
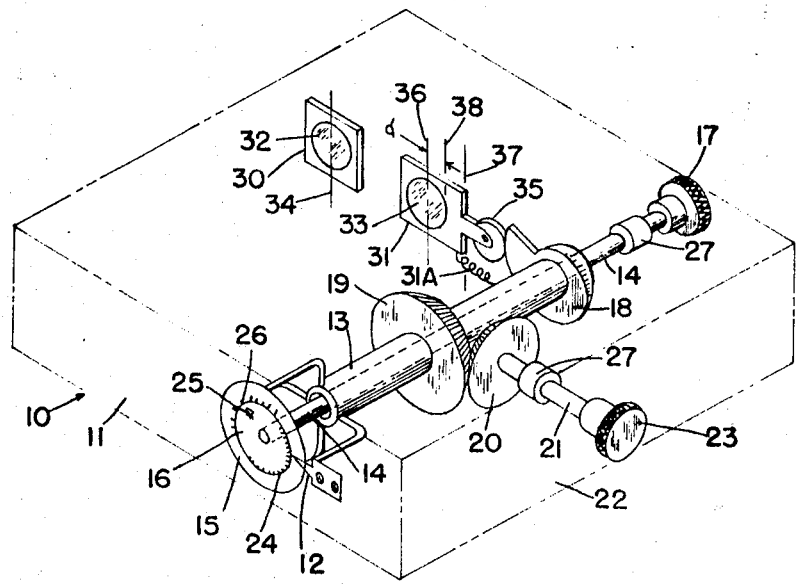
FIG. I.
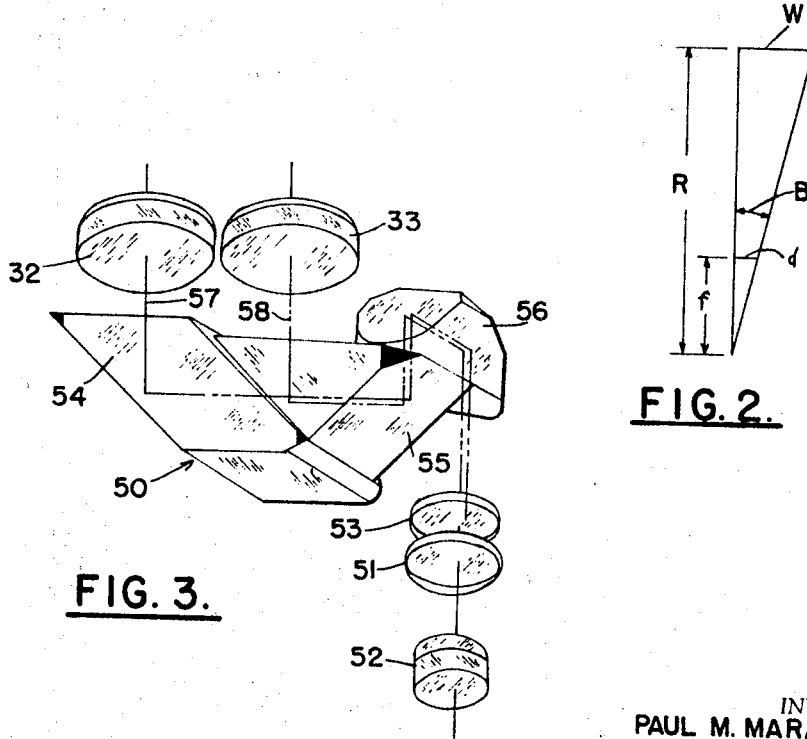
FIG. 3.
FIG. 2.
INVENTORS
PAUL M. MARASCO
WALTER W. HOLLIS
BY:
ATTORNEYS:

United States Patent Office 3,459,478
Patented Aug. 5, 1969

3,459,478
STADIAMETRIC RANGEFINDER INCLUDING A TRANSVERSELY MOVABLE LENS
Paul M. Marasco, Cherry Hill, N.J., and Walter W. Hollis, Salinas, Calif., assignors to the United States of America as represented by the Secretary of the Army
Continuation-in-part of application Ser. No. 364,040, Apr. 30, 1964. This application Dec. 2, 1968, Ser. No. 780,503
Int. Cl. G01c 3/22
U.S. Cl. 356—22                     2 Claims

ABSTRACT OF THE DISCLOSURE

A stadiametric rangefinding instrument having a beam-splitting optical system including a prism cluster, formed of a rhomboid prism and a pair of porro prisms, to combine incident target image beams from stationary and movable lenses and direct the combined beams to a reticle and eye lens aligned therewith. The ranging mechanism, upon adjustment to provide for an estimated target width, has a range knob which rotates, through bevel gearing, a coaxial cam and range dial as the movable lens is translated laterally to follow the cam surface by a biasing spring. When, after initially setting the instrument with viewable coinciding target images range knob rotation enables viewing of transversely abutting or aligned end-to-end target images in a single exit pupil through the eye lens, the movable lens has moved laterally a distance representing a proportional amount of the target width and an accurate indication of the target range is observable on the range dial.

---

This application is a continuation-in-part of application Ser. No. 364,040, filed Apr. 30, 1964 and now abandoned.

The invention described herein may be manufactured, used, and licensed by or for the Government for governmental purposes without the payment to us of any royalty thereon.

This invention relates to rangefinders, and more particularly, to a rangefinder based on the stadia principle.

A primary object of the invention is to provide a simple, compact rangefinding instrument having a relatively high degree of accuracy with which ranges can be determined.

Another object of the invention is to provide such an instrument utilizing a minimum of parts.

Other objects, advantages, and features will become apparent from the following description when considered in conjunction with the drawings in which:

FIG. 1 is substantially a diagrammatic view of an instrument embodying the principles of the invention; and FIG. 2 is a geometric illustration incorporating certain mathematical relationships upon which the invention is based.

FIG. 3 is an exploded view of the optical system of the instrument.

In one aspect of the invention a stadiametric rangefinder, having a pair of relatively movable lenses and a stationary index, includes a pair of rotatable concentric shafts each having a dial containing log indicia means, one of the dials having index means thereon. Provided are means for independently rotating the shafts and means connected to one shaft and to one lens for translating linear movement of the one lens into logarithmic movement of the one shaft.

The stadiametric rangefinding instrument housing, denoted generally by reference numeral 10 (FIG. 1) is partially shown in phantom with portions broken away. Fixed to and preferably offset from the front wall surface 11 of the instrument is a stationary width index 12. Suitably journalled adjacent the front and rear walls, respectively, are opposed end portions of independently rotatable concentric shafts 13, 14. The outer shaft 13 is provided with an annular range scale or dial 15 the surface of which preferably underlies index 12 and is substantially flush with the adjacent front wall surface. The longer inner shaft 14 extends through shaft 13 and has on its front extremity a circular width scale or dial 16 the surface of which is flush with and suitably supported for rotation within the surface of dial 15. The rear extremity of shaft 14 carries a width knob 17, by which shaft 14 and its dial or face plate 16 can be rotated to selected positions. Within the instrument 10, shaft 13 at its rear portion carries for rotary movement therewith a transversely oriented log cam 18. A driven bevel gear 19 is fixed to an intermediate portion of shaft 13 and is in engagement with a mating driving bevel gear 20 carried by one end of a third shaft 21. Shaft 21 is oriented transversely of shafts 13, 14 and its other or outer end, suitably journalled in side wall 22, is provided with range knob means 23.

Along a portion of its peripheral surface dial 16 is provided with log width indicia means 24 in close proximity to index 12. The peripheral surface of dial 16 also is provided with range index means 25 for cooperation with log range indicia means 26 located along a substantial portion of the annular dial inner peripheral surface.

Each of shafts 14 and 21 are provided with an appropriate two way stop means 27 such that independent rotation of knobs 17 and 23 will produce respective independent rotation of shafts 14 and 13 between predetermined limits. Corresponding limited movements of the indicia means 24, 26 relative to their respective index means 12, 25 are one consideration in establishing the respective extreme indicia logarithmic values and indicia graduations therebetween. Another significant consideration in this respect is the constant focal length of the system as will be hereinafter described.

The focal system of the instrument includes a pair of lens arrangements 30, 31, which preferably are arranged in transverse alignment with the cam surface of log cam 18 and provide the means for sighting upon a target. The system is such that each lens 32, 33 (FIGS. 1, 3) will produce a separate target image, when viewed simultaneously with one eye through an appropriate eye piece, formed of a field lens 51 and eye lens 52, an associated prism cluster beam splitter arrangement shown generally at 50 (FIG. 3), the eye piece being located at the viewing end or front of the instrument a predetermined distance from the focal plane with the field lens 51 and eye lens 52 in longitudinal alignment with reticle 53. Movable lens 33 can be laterally adjusted from one position where its target image theoretically can be viewed through eye lens 52 as superimposed upon the target image transmitted through the stationary lens 32, to another position where the respective target images are viewed in a single exit pupil in an abutting or aligned end-to-end relationship. The beam-splitting optical system includes a prism cluster formed of a rhomboid prism 54, having a surface longitudinally aligned with stationary lens 32, and a pair of porro prisms 55, 56 appropriately cemented together and arranged with the eye lens 52, field lens 51 and reticle 53 longitudinally aligned with a portion of porro prism 56, and with movable lens 33 longitudinally aligned with a portion of porro prism 55. An appropriate coating on the surface of rhomboid prism 54 abutting porro prism 55 provides the prism custer with a beam-splitting surface such that target images or incident beams 57, 58 are combined from the respective lenses 32, 33 and the combined beams are directed to the reticle 53 and eye lens 52 as shown in FIG. 3 and readily seen by an eye of an instrument operator. Preferably lens arrangement 30 is fixed to or otherwise stationary within the instrument to preclude lateral movement of the vertical central axis 34. For cooperation therewith, lens arrangement 31 preferably carries cam follower or roller 35 biased by a suitable tension spring 31A to engage cam 18 and is slidably mounted for transverse reciprocation toward and away from the longitudinal axis of hollow cam shaft 13. The transverse reciprocation, as controlled by the contour of cam 18 and by the stop means on range knob shaft 21, permits transverse adjustment of the movable lens 33 between predetermined limits for bringing the separate target images as viewed through the lenses into an abutting relationship or into alignment end-to-end. The vertical central axis of movable lens 33 thus can be transversely adjusted between predetermined locations 36 and 37 where location 36 is viewed through eye lens 52 as coinciding with stationary axis 34 and, when moved to a selected position 38 where it is a distance $d$ from location 36, the linear distance $d$ is automatically converted by the log cam 18 into log $d$ rotation of shaft 13 and range indicia 26 carried therewith.

Observing FIG. 2, the geometric relationship illustrates that a target having a relatively small width W will subtend as an arc or chord of a very small angle B at a relatively large but unknown range or distance R from the observer. When the observer sights this target with the separate images produced through lenses 32, 33 in an abutting relation, the distance $d$ as determined by the position of lens 33 will likewise subtend a proportionally smaller arc or chord of angle B at a predetermined distance $f$, the constant focal length of the system. The trigonometric tan of minute angle B may thus be expressed by the relationship:

$$\text{Tan } B = W/R \quad (1)$$

$$\text{Tan } B = d/f \quad (2)$$

By substitution:

$$W/R = d/f \quad (3)$$

$$R = fW/d \quad (4)$$

hence from Equation 4:

$$\text{Log } R = \text{Log } f + \text{Log } W - \text{Log } d \quad (5)$$

With the concentric range and width scales 26, 24 graduated logarithmically in oppositely directed increments and containing a built-in constant quantity log $f$, an observer can estimate the width W, if it is not already known, and set the log W indicia by turning width knob 17 such that stationary index 12 indicates the estimated or known width value. Preferably the log width scale is graduated counter-clockwise and is adjustable by clockwise rotation of knob 17 from positions indicating a width of 4 feet to 30 feet. With the range index 25 now set, range knob 23 may be rotated counter-clockwise to rotate shaft 13 and its log cam 18 and range dial 15 in a clockwise direction. This enables the biased movable lens arrangement 31 to move tranversely toward shaft 13 a variable distance $d$ to a position with the vertical central axis of lens 33 at location 38, and the converted log $d$ is thus subtracted from the sum of log $f$ and log W as the range index 25 indicates the range of the target with a relatively high degree of accuracy.

It should be noted that a revised or subsequent estimate of the target width, when set by further movement of knob 17, can readily produce a corresponding revised range value.

We claim:

1. In a stadiametric rangefinding instrument having a beam-splitting optical system, said system including a prism cluster of a rhomboid prism and a pair of porro prisms, an eye lens, a field lens and a reticle all in longitudinal alignment with a portion of one of said porro prisms, a pair of lenses relatively movable in a transverse direction within the instrument and in corresponding longitudinal alignment with said rhomboid prism and a portion of the other of said porro prisms, said rhomboid prism having a beam-splitting surface for combining incident beams from said lenses and directing the combined beams to said reticle and eye lens, said instrument having a first longitudinally extending shaft rotatable within said instrument, a first disk carried by one end of said first shaft, a stationary index on said instrument and positioned adjacent the peripheral face of said first disk, said first disk having log width indicia means on at least a portion of its peripheral face, index means positioned at the peripheral edge of said first disk, knob means carried by the other end of said first shaft for rotating said first shaft between predetermined limits, a second shaft rotatably and concentrically mounted about a lengthwise portion of said first shaft, an annular disk surrounding said first disk and carried by said second shaft, said annular disk having log range indicia means located on at least a portion of its inner periphery adjacent said index means, range knob means oriented transversely of said first shaft knob means and connected to said second shaft for rotating said second shaft between predetermined limits, a log cam carried by said second shaft and in transverse alignment with one of said lenses, a cam follower carried by said one lens and biased to engage said log cam, so that said knob means can be rotated to set said log width indicia means at a selected position relative to said stationary index and said range knob means rotated to transversely move said second lens simultaneously with rotational movement of said log range indicia means relative to said index means.

2. In a stadiametric rangefinding instrument having a beam-splitting optical system, said system including a prism cluster of a rhomboid prism an da pair of porro prisms, an eye lens, a field lens and a reticle all in longitudinal alignment with a portion of one of said porro prisms, a pair of lenses relatively movable in a transverse direction within the instrument and in corresponding longitudinal alignment with said rhomboid prism and a portion of the other of said porro prisms, said rhomboid prism having a beam-splitting surface for combining incident beams from said lenses and directing the combined beams to said reticle and eye lens, said instrument having a first longitudinally extending shaft rotatable within said instrument, a first circular face plate carried by one end of said first shaft, stationary width index means on said instrument and positioned adjacent the periphery of said first face plate, said first plate having log width indicia means on at least a portion of its periphery, range indexing means positioned at the peripheral edge of said first plate, width knob means carried by the other end of said first shaft for rotating said first shaft, two way stop means carried by said first shaft intermediate said first plate and width knob means for limiting rotation of said width indicia means between predetermined limits, a second shaft rotatably and concentrically mounted about a lengthwise portion of said first shaft, an annular face plate surrounding said first plate and carried by said second shaft, said annular plate having log range indicia means located on at least a portion of its inner periphery adjacent said range indexing means, a third shaft disposed transversely of said first and second shafts, beveled gears on said second and third shafts mechanically connecting such shafts, range knob means on said third shaft for rotating said second and third shafts, two way stop means carried by said third shaft for limiting rotation of said range indicia means between predetermined limits, the first of said lenses fixed relative to said instrument and having its optical axis parallel to said first shaft, the second of said lenses slidably arranged for reciprocating movement transversely of said first lens central axis and said first and second shafts, a log cam carried by said second shaft and in transverse alignment with said second lens, a roller rotatably carried by said second lens and biased to engage said log cam, so that said width knob means can be rotated to set said log width indicia means at a selected position relative to its indexing means and said range knob means rotated to transversely move said second lens simultaneously with rotational movement of said log range indicia means relative to said range indexing means.

No references cited.

JEWELL H. PEDERSEN, Primary Examiner

ORVILLE B. CHEW, Assistant Examiner